C. H. BONG.
PRESSURE REGULATOR.
APPLICATION FILED SEPT. 2, 1908.
944,255.
Patented Dec. 28, 1909.
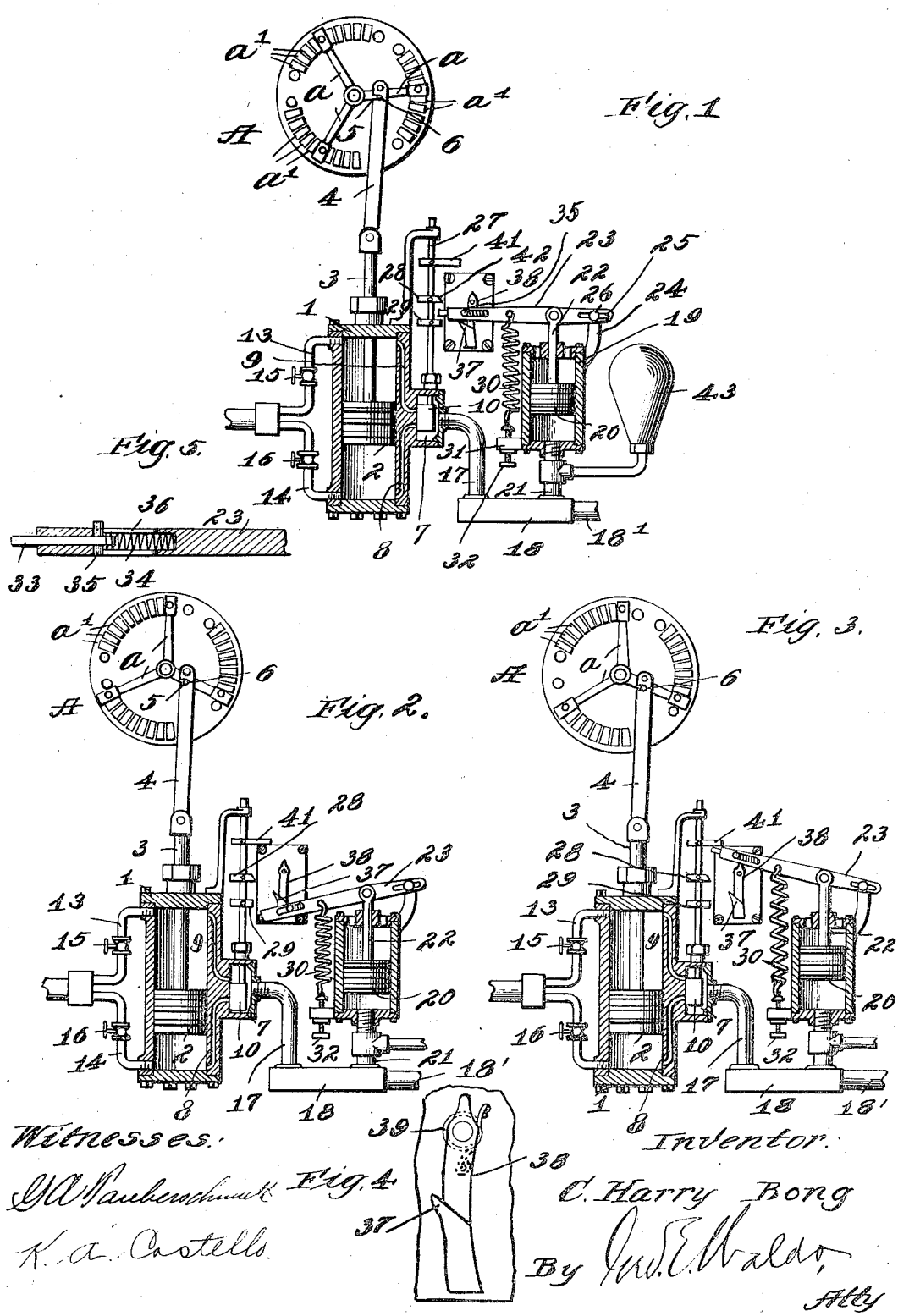
Witnesses:
Inventor.
C. Harry Bong
By Jno. E. Waldo,
Atty

UNITED STATES PATENT OFFICE.

CLARENCE HARRY BONG, OF CHICAGO, ILLINOIS.

PRESSURE-REGULATOR.

944,255.

Specification of Letters Patent. Patented Dec. 28, 1909.

Application filed September 2, 1908. Serial No. 451,345.

*To all whom it may concern:*

Be it known that I, CLARENCE HARRY BONG, a citizen of the United States, and a resident of Chicago, in the county of Cook and State of Illinois, have invented certain new and useful Improvements in Pressure-Regulators, of which the following is a specification.

This invention relates to pressure regulators and relates particularly to regulators for automatically controlling or regulating the fluid pressure in mains, conduits, or other receptacles, of fluid supply systems, as in gas and water mains, air conduits, and the like.

The object of the invention is to provide a pressure regulator for fluid supply systems controlled by the fluid pressure therein, for automatically maintaining a substantially uniform fluid pressure in said system, under normal conditions, and, preferably, also, for automatically increasing or decreasing the pressure in said system to a desired maximum or minimum pressure in case of emergency where a relatively high or low pressure is desired, as, for example, to increase the pressure in water mains in case of fire.

A pressure regulator of my invention consists of the various features, combinations of features and details of construction hereinafter described and claimed.

In the accompanying drawings, in which my invention is fully illustrated—Figure 1 is a sectional view of my improved pressure regulator. Figs. 2 and 3 are views substantially similar to Fig. 1, showing, respectively, the positions of the operative parts in case of excessive decrease and increase of the fluid pressure in the system. Fig. 4 is an enlarged detail view of the cam for disengaging the lever which operates the valve of the double-acting cylinder; and Fig. 5 is an enlarged detail sectional view of the extension end of said operating lever.

So far as I am now aware, the broadest field for the use of my improved pressure regulator is in connection with water works systems, in order to maintain a substantially uniform pressure in the mains, say forty pounds, under ordinary conditions of use, and to automatically increase the pressure in the mains to a desired maximum pressure, say eighty pounds, in case of emergency, as in case of fire. For the purpose, therefore, of rendering the accompanying description more specific and definite, I have described my improved regulator as applied for this purpose, the pumps, not shown, being driven by means of an electric motor, also not shown.

Referring now to the drawings, A designates, as a whole, a controller for the electric motor or motors which drive the fluid supply pumps, said controller being of the familiar type comprising an electrical contact or contacts mounted on an arm or arms $a$, said contact or contacts being adapted to be brought successively into engagement with a series of fixed contacts $a^1$ by rotation of the arm $a$.

Mounted in fixed position adjacent to the controller A, preferably with its axis in the plane of movement of the arm $a$ and with its axis eccentric to the axis of rotation of said arm $a$, is a double-acting cylinder 1 fitted to which is a piston 2, the piston rod 3 of which is connected to the arm $a$ of the controller A at a distance from its axis of rotation, preferably by means of a link 4, the opposite ends of which are pivotally connected to said piston rod, and to said arm $a$, respectively, whereby movement of the piston 2 will operate to turn the controller arm $a$.

To provide for operating the controller A by hand, when desired, the link 4 is preferably connected to the controller arm $a$ so that it may be quickly and conveniently disengaged therefrom. As shown, said link 4 is connected to the controller arm $a$ by means of a transverse slot 5 in one edge of said link which is adapted to engage a pin 6 on said controller arm $a$.

The cylinder 1 is provided with a valve chest 7, the interior of which is connected with opposite ends of said cylinder by admission ports 8 and 9 which, as shown, are controlled by means of a usual form of slide valve 10, all in a familiar manner. Said cylinder 1 is also provided at its opposite ends with discharge ports which communicate, respectively, with waste pipes 13 and 14, said waste pipes being preferably controlled by means of suitable stop cocks 15 and 16, respectively, to provide for regulating the speed with which the piston 2 moves and thus the speed with which the controller arm $a$ is turned and the electric current increased or decreased, said stop cocks being preferably so adjusted that the current will be increased and decreased gradually.

The valve chest 7 is in open communication with a water main, not shown, by means of suitable pipe connections therewith, whereby said valve chest will at all times be filled with fluid under the same pressure as that in the main. As shown, a pipe 17 connects said valve chest 7 with a header 18 which is connected with the water main by means of a pipe 18¹.

The valve 10 which controls the admission ports 8 and 9 is adapted to be automatically operated to admit fluid under pressure to one end or the other of the cylinder 1 by means controlled by the fluid pressure in the main, or what is the same thing, by the fluid pressure in the header 18, in the following manner:—Mounted in fixed position, in operative relation to the valve chest 7, is a cylinder 19, to which is fitted a piston 20. Communicating with the cylinder 19 at one side of the piston 20, is a pipe 21 through which said cylinder is in open communication with the main, whereby the portion of said cylinder between said pipe and piston will at all times be filled with fluid under the same pressure as that contained in the main. Said cylinder is thus single-acting. As shown, the pipe 21 is rigidly secured in and communicates directly with the header 18, the opposite end thereof being rigidly secured in the head of the cylinder 19, said pipe 21 thus forming the support for said cylinder. Secured in the piston 20, is a piston rod 22, the end of which projects through the head of the cylinder 19 opposite to that in which the pipe 21 is secured. In order to avoid the formation of an air cushion in the end of the cylinder opposite to that to which the fluid under pressure is admitted, vent holes are preferably formed in the cylinder head through which the piston rod 22 extends, whereby the air pressure therein will always be equal to atmospheric pressure. Pivotally connected to the projecting end of the piston rod 22, is a lever 23 one end of which is pivotally connected to a fixed support, as to a bracket 24 formed on the cylinder 19, one of said pivotal connections, as shown, the pivotal connection to the bracket 24, comprising a slot 25 which engages a suitable pivot stud 26 on said bracket, thereby providing for desired pivotal movement of said lever. The opposite end of said lever is free and normally projects between suitable rigid stops on the valve stem 27 of the valve 10, said valve stem being rigidly connected with the valve 10 and extending through a bearing formed in an end of the valve chest, leakage through said bearing being prevented by means of a suitable packing gland or stuffing box. As shown the stops on the valve stem 27 between which the end of the lever 23 extends, consist of collars 28 and 29 rigidly secured to said valve stem preferably in such manner as to be adjustable lengthwise thereof, as by means of set screws. In order to render the device more sensitive, the length of the lever from its free end to its point of pivotal attachment to the piston rod 22 is made considerably greater than the length of said lever from its point of pivotal attachment to said piston rod 22, to its point of pivotal attachment to the bracket 24, the relation, as shown, being about two to one, whereby the travel of the free end of the lever will be about three times that of the piston 20. The lever 23 is adapted to be moved pivotally in the direction opposite to that in which it is adapted to move under the influence of a fluid pressure applied to the piston 20 by a force, preferably substantially constant, as a spring or a weight. As shown, said force consists of a coil spring 30, one end of which is connected to said lever 23 and the other end to a suitable fixed support, as a lug 31 on the cylinder 19. To provide for adjusting the tension of said spring and thus the force applied to said lever opposed to the action of the piston 20 thereon, said spring 30 is preferably connected to the lug 31 by means of a screw 32 connected directly to said spring and threaded to a suitable hole or opening in said lug 31, said screw being preferably connected to said spring by means of a swivel joint to provide for turning the same relatively to said spring. Threaded to the screw 32 at the side of the lug 31 opposite to the spring 30, is a lock nut and secured to the end of said screw is a suitable hand wheel for conveniently turning the same. In the operation of the device, the adjustment of the spring 30 is such that it will at all times be under tension and the stops 28 and 29 are so positioned on the valve stem 27, that with a desired normal pressure in the main, the free end of the lever 23 will be between the stops 28 and 29 but out of contact with both thereof, the relation being preferably such that said lever will extend in a direction substantially at right angles to the piston rod 22. The relation is such, also, that under the influence of the fluid pressure in the cylinder 19 and the spring 30, the lever 23 acting on the stops 28 and 29 will have capacity for movement sufficient to impart movement to the valve 10 to open and close both of the admission ports 8 and 9 of the cylinder 1.

With the described construction, it is obvious that, with a desired predetermined normal fluid pressure in the main, the valve 10 will be in central position so as to close both admission ports 8 and 9 of the cylinder 1 and that the free end of the lever 23 will be out of contact with both stops 28 and 29 on the valve stem 27. When, however, from any cause, the fluid pressure in the main exceeds normal pressure, a fluid pressure in excess of normal will be at once exerted on the piston 20 in the cylinder 19 which will operate to move the lever 23 pivotally against the force of the spring 30 and will cause it to contact with the stop 28 on the valve stem 27 and thereby impart movement to the valve 10 sufficient to open the admission port 8 of the cylinder 1, whereupon fluid under pressure will flow into the corresponding end of the cylinder 1, which will operate, in an obvious manner, to impart movement to the piston 2 therein, which, through the piston rod 3 and link 4, will operate to turn the controller arm $a$, the relation being such that the movement imparted to said controller arm will operate to reduce the current supplied to the motor which drives the pump. Whereupon the speed of the motor or motors will be reduced and the quantity of fluid supplied to the mains by the pumps reduced, thereby causing the fluid pressure in the main to fall. As the pressure in the main falls the tension of the spring 30 will operate to move the lever 23 in a direction to engage the stop 29 and through it to impart movement to the valve 10 in a direction to close the port 8, which movement will continue until the pressure in the main again becomes normal, at which time the port 8 will have been fully closed. Again, assume that from some cause, the pressure in the main falls somewhat below normal. Thereupon the pressure on the piston 20 will be reduced so that the spring 30 will impart pivotal movement to the lever 23 to move the valve 10 in the direction to open the admission port 9 of the cylinder 1, whereupon fluid under pressure will flow from the valve chest 7 into the end of the cylinder 1 with which said admission port 9 communicates, and will impart movement to the piston 2 to turn the controller arm $a$ in a direction to increase the electrical current supplied to the pump motors, which will operate to increase the speed of the motors and of the pumps driven thereby and to increase the quantity of fluid under pressure supplied to the main. As the pressure in the main increases, the pressure on the piston 20 will increase and will operate to move the lever 23 toward normal, which movement will continue until said lever reaches its normal position, in attaining which it will have engaged the stop 28 and thus moved the valve 10 sufficiently to close the admission port 9, in which position it will remain until the fluid pressure in the main again varies from normal.

To provide for an automatic increase of the fluid pressure in the system in case of emergency, as the water pressure in the mains of a water works system in case of fire, means are provided for automatically disengaging the lever 23 from the stops 28 and 29, by a decrease in pressure in the main below the normal, due to a large excessive use of water above normal, whereby the lever 23 will first engage the stop 29 to impart movement to the valve 10 to fully open the admission port 9, whereby the speed of the motors will be increased to full speed, corresponding to a desired maximum pressure in the main, and will then be retracted from between said stops 28 and 29 to permit pivotal movement of said lever 23 without contacting with either of said stops 28 or 29. As shown, the means for this purpose are as follows:—Slidably mounted at the free end of the lever 23, so as to form an extension thereof, is an extension bar 33, which is held normally at the limit of its extension by means of a spring 34 applied to the rear end thereof, movement of said extension bar under the influence of said spring being limited by means of a suitable stop, as shown, by a pin 35 secured in said extension bar which engages a slot 36 formed in the lever 23. Retraction of the extension bar 33, when the lever 23 reaches its designed lowermost position, is effected by engagement of the pin 35 which projects beyond the side of the lever 23, with a fixed cam 37, said cam being downwardly inclined away from the stops 28 and 29 so that, as the pin 35 rides down the same, as the lever 23 is turned down by the spring 30, the extension bar 33 will be retracted from between the stops 28 and 29. As previously explained, however, before the extension bar 33 is thus retracted, the valve 10 will have been moved so as to open the port 9, which will operate to turn on and increase the speed of the motors and pumps and thus to increase the quantity of water supplied to the main and the fluid pressure in said main. As the fluid pressure in the mains increases, movement will be imparted to the lever 23 under the influence of the piston 20 and to prevent reëngagement of the extension bar 33 with the stops 28 and 29, a pivoted shunt cam 38 is provided, the free end of said shunt cam being held normally in contact with the fixed cam 37, by means of a spring 39 applied thereto, the relation being such that, when the pin 35 is in engagement with the shunt cam 38, the extension bar 33 will be held in retracted position out of engagement with the stops 28 and 29. The relative positions of the fixed cam 37 and of the shunt cam 38 are such that, when the extension bar 33 is extended, the pin 35 will clear the shunt cam 38, but will engage the fixed cam 37.

With the described construction, excessive pivotal movement of the lever 23 under the influence of the spring 30 will cause the pin 35 to engage the fixed cam 37, thus retracting the extension bar 33. The shunt cam 38 being yieldingly supported by the spring 39 applied thereto, will permit the pin 35 to pass said shunt cam which will be returned to its normal position as soon as said pin passes out of engagement with the same, so as to be engaged by said pin 35 as the lever 23 moves under the influence of the piston 20, as the pressure in the mains again increases. The shunt cam 38 is of such length that it will operate to hold the extension bar 33 in retracted position until it has passed the stop 28, and will then release said extension bar, allowing it to resume its normal position. During all of this time the valve 10 has been in position corresponding to open position of the port 9 with the motors and pumps running at full speed. When the fluid pressure in the mains exceeds a desired maximum pressure, movement is adapted to be imparted to the valve 10 to close the port 9 and open the port 8 by contact of the free end of the lever 23 with a stop 41 on the valve stem 27, the operation being substantially the same as when said lever contacts with the stops 28 and 29. When the fluid pressure in the mains again becomes normal, reëngagement of the lever 23 with the stops 28 and 29 is effected by suitable means. As shown, a cam surface 42 is formed on the stop 28 with which the end of the extension bar 33 is adapted to engage, as the lever 23 moves under the influence of the spring 30, so as to force said extension bar 33 rearward until it passes said stop 28, whereupon it will at once be forced outwardly into its normal position between said stops 28 and 29.

In order to render my improved regulator more sensitive, that is, so that it will respond to slight variations of pressure in the system, when the fluid contained in the system is inelastic, as water, I preferably provide a cushion to break or relieve the rigid resistance of the inelastic fluid acting on the piston 20. As shown, I employ an air chamber 43 which communicates with the cylinder 19, being shown as connected directly to the supply pipe 21 of the cylinder 19.

While I have herein described my invention as applied to an electric motor, it may equally well be applied to the throttle valve of a steam engine, so as to control the speed of the engine, in substantially the same manner as it controls the speed of the electric motor. Also, while, for purposes of concrete illustration, I have described my pressure regulator as applied for regulating the pressure in water mains, it may obviously be equally well applied for regulating the pressure in gas mains, air conduits, or other receptacles.

I claim:—

1. In a pressure regulator for a fluid supply system, the combination with a speed-controlling device for a fluid supply motor, of means for automatically operating said speed-controlling device controlled by the fluid pressure, whereby the speed of the motor will be increased as the pressure falls, and vice versa, and means rendered operative by an excessive initial variation of the fluid pressure from normal for disengaging said means for so controlling said motor speed-controlling device, thereby providing for an excessive final variation of the fluid pressure opposite to the initial excessive variation.

2. In a pressure regulator for a fluid supply system, the combination with a speed-controlling device for the fluid supply motor, of means for automatically operating said speed-controlling device controlled by the fluid pressure, whereby the speed of the motor will be increased as the pressure falls, and vice versa, and means rendered operative by an excessive initial variation of the fluid pressure from normal for disengaging said means for so controlling said motor speed-controlling device, thereby providing for an excessive final variation of the fluid pressure opposite to the initial excessive variation, and means rendered operative by a fluid pressure beyond a predetermined maximum or minimum fluid pressure for operating the motor speed-controlling device.

3. In a pressure regulator for a fluid supply system, the combination with a speed-controlling device for the fluid supply motor, of adjustable means for automatically operating said speed-controlling device controlled by the fluid pressure, whereby the speed of the motor will be increased as the pressure falls, and vice versa, and adjustable means rendered operative by an excessive initial variation of the fluid pressure from normal for disengaging said means for so controlling said motor speed-controlling device, thereby providing for an excessive final variation of the fluid pressure to the initial excessive variation.

4. In a pressure regulator for a fluid supply system, the combination with a speed-controlling device for the fluid supply motor, of means for operating said speed-controlling device controlled by the fluid pressure, whereby the speed of the motor will be increased as the pressure falls, and vice versa, said means comprising a double-acting cylinder, comprising a valve chest and a valve therein, said cylinder being provided with admission ports controlled by said valve and with discharge ports, a pipe adapted for connecting the valve chest with said fluid system, a piston in said cylinder, operative connection between said piston and the motor speed-controlling device, a valve stem rigidly secured to the valve of said cylinder, a single acting cylinder, a piston therein, a pipe adapted to connect said cylinder with said fluid system at one side of the piston therein, a piston rod secured in said piston, a lever pivotally connected to said piston rod and to a fixed support, means adapted for actuating said lever against the force of the fluid pressure on said piston and stops on the stem of the valve of the double-acting cylinder with which the free end of said pivoted lever engages.

5. In a pressure regulator for a fluid supply system, the combination with a speed-controlling device for the fluid-supply motor, of means for operating said speed-controlling device controlled by the fluid pressure, whereby the speed of the motor will be increased as the pressure falls, and vice versa, said means comprising a double-acting cylinder, comprising a valve chest, a valve therein, provided with admission ports controlled by said valve, and discharge ports, a pipe adapted for connecting the valve chest with the receptacle of said fluid system, a piston in said cylinder, operative connection between said piston and the motor speed-controlling device, a valve stem rigidly secured to the valve of said cylinder, a single acting cylinder, a piston therein, a pipe adapted to connect said cylinder with the receptacle of said fluid system at one side of the piston therein, a piston rod secured in said piston, a lever pivotally connected to said piston rod and to a fixed support, means adapted for actuating said lever against the force of said piston, and adjustable stops on the stem of the valve of the double-acting cylinder with which the free end of said pivoted lever engages.

6. In a pressure regulator for a fluid supply system, the combination with a speed-controlling device for the fluid supply motor, of means for operating said speed-controlling device controlled by the fluid pressure, whereby the speed of the motor will be increased as the pressure falls, and vice versa, said means comprising a double-acting cylinder, comprising a valve chest, a valve therein, provided with admission ports controlled by said valve, and discharge ports, a pipe adapted for connecting the valve chest with the receptacle of said fluid system, a piston in said cylinder, operative connection between said piston and the motor speed-controlling device, a valve stem rigidly secured to the valve of said cylinder, a single acting cylinder, a piston therein, a pipe adapted to connect said cylinder with the receptacle of said fluid system at one side of the piston therein, an air chamber which communicates with the closed end of said cylinder, a piston rod secured in said piston, a lever pivotally connected to said piston rod and to a fixed support, means adapted for actuating said lever against the force of said piston, and adjustable stops on the stem of the valve of the double-acting cylinder with which the free end of said pivoted lever engages.

7. In a pressure regulator for a fluid supply system, the combination with a speed-controlling device for the fluid supply motor, of means for operating said speed-controlling device controlled by the fluid pressure, whereby the speed of the motor will be increased as the pressure falls, and vice versa, said means comprising a double-acting cylinder, comprising a valve chest, a valve therein, provided with both admission ports controlled by said valve, and discharge ports, a pipe adapted for connecting the valve chest with the receptacle of said fluid system, a piston in said cylinder, operative connection between said piston and the motor speed-controlling device, a valve stem rigidly secured to the valve of said cylinder, a single-acting cylinder, a piston therein, a pipe adapted to connect said cylinder with the receptacle of said fluid system at one side of the piston therein, a piston rod secured in said piston, a lever pivotally connected to said piston rod and to a fixed support, a spring or equivalent means applied to said lever adapted for actuating the same against the force of said piston, and stops on the stem of the valve of the double-acting cylinder with which the free end of said pivoted lever engages.

8. In a pressure regulator for a fluid supply system, the combination with a speed-controlling device for the fluid supply motor, of means for operating said speed-controlling device controlled by the fluid pressure, whereby the speed of the motor will be increased as the pressure falls, and vice versa, said means comprising a double-acting cylinder, comprising a valve chest, a valve therein, provided with both admission ports controlled by said valve, and discharge ports, a pipe adapted for connecting the valve chest with the receptacle of said fluid system, a piston in said cylinder, operative connection between said piston and the motor speed-controlling device, a valve stem rigidly secured to the valve of said cylinder, a single-acting cylinder, a piston therein, a pipe adapted to connect said cylinder with the receptacle of said fluid system at one side of the piston therein, a piston rod secured in said piston, a lever pivotally connected to said piston rod and to a fixed support, a spring or its equivalent applied to said lever adapted for actuating the same against the force of said piston, means for varying the tension of said spring and stops on the stem of the valve of the double-acting cylinder with which the free end of said pivoted lever engages.

9. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, and a shunt cam adapted to maintain said extension bar retracted.

10. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, and a shunt cam adapted to maintain said extension bar retracted until its free end has passed the normal control-stops on the stem of the valve of the double-acting cylinder, and an emergency stop on said valve stem adapted to be engaged by the free end of said lever when extended.

11. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, a shunt cam adapted to maintain said extension bar retracted until its free end has passed the normal control-stops on the stem of the valve of the double-acting cylinder, and an adjustable emergency stop on said valve stem adapted to be engaged by the free end of said lever when extended.

12. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally retracted, a pin secured therein, said lever being provided with a slot with which said pin engages, a cam, engagement of which with the pin in said extension bar to retract said extension bar is adapted to be effected by a predetermined excessive movement of said lever beyond its movement in maintaining normal control, and a shunt cam adapted to maintain said extension bar retracted.

13. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, and a pivoted shunt cam adapted to maintain said extension bar retracted, the free end of said shunt cam projecting into the path of travel of the part of said extension bar which engages the retracting cam, the relation being such that the movement of said lever to effect full retraction of said extension bar will cause a part of said lever to pass said shunt cam so as to be engaged thereby on the return movement of said lever.

14. In a pressure regulator for a fluid supply system, the combination with a speed-supply system, the combination with a speed-controlling device for the fluid supply motor, of means for automatically operating said speed-controlling device controlled by said fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, and a pivoted shunt cam adapted to maintain said extension bar retracted, the free end of said shunt cam projecting into the path of travel of the part of said extension bar which engages the retracting cam, the relation being such that the movement of said lever to effect full retraction of said extension bar will cause a part of said lever to pass said shunt cam so as to be engaged thereby on the return movement of said lever, and a spring applied to said shunt cam adapted to maintain the same normally in position to engage said extension bar.

15. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, and a shunt cam adapted to maintain said extension bar retracted until its free end has passed the normal control-stops on the stem of the valve of the double-acting cylinder, an emergency stop on said valve stem adapted to be engaged by the free end of said lever when extended, and means for effecting reëngagement of said lever with the normal control stops as said lever moves away from said emergency stops.

16. In a pressure regulator for a fluid supply system, the combination with a speed-controlling device for the fluid supply motor, of means for automatically operating said speed-controlling device controlled by the fluid pressure in said system, said means comprising a double-acting cylinder, comprising a valve chest, a valve therein, and provided with admission ports controlled by said valve, and with discharge ports, a pipe adapted for connecting the valve chest with said fluid system, a piston in said cylinder, operative connection between said piston and the motor speed-controlling device, a valve stem rigidly secured to the valve of said cylinder, a single-acting cylinder, a piston therein, a pipe adapted to connect said piston with said fluid system at one side of the piston therein, a piston rod secured in said piston, and a lever pivotally connected to said piston rod and to a fixed support, means adapted for actuating said lever against the force of the fluid pressure on said piston, stops on the stem of the valve of the double-acting cylinder with which the free end of said pivoted lever engages, and means for disengaging said lever from said stops to permit excessive variation of the fluid pressure in said fluid system, said means comprising an extension bar slidably mounted at the free end of said lever, a spring applied thereto adapted to maintain the same normally extended, a cam, engagement of which with said extension bar to retract the same is adapted to be effected by a predetermined excessive movement of said lever beyond its movement in maintaining normal control, and a shunt cam adapted to maintain said extension bar retracted until its free end has passed the normal control-stops on the stem of the valve of the double-acting cylinder, an emergency stop on said valve stem adapted to be engaged by the free end of said lever when extended, and means for effecting reëngagement of said lever with the normal control stops as said lever moves away from said emergency stops, said means comprising a suitable cam surface formed on the normal control stop adjacent to said emergency stop.

In testimony, that I claim the foregoing as my invention, I affix my signature in presence of two subscribing witnesses, this 28th day of August, A. D. 1908.

C. HARRY BONG.

Witnesses:
K. A. COSTELLO,
M. V. MCGRATH.